United States Patent [19]

Yung

[11] Patent Number: 5,410,949
[45] Date of Patent: May 2, 1995

[54] AUTOMATIC BREADMAKING MACHINE

[75] Inventor: Siu Y. Yung, Taiwai, Hong Kong

[73] Assignee: Chiaphua Industries Limited, Hong Kong

[21] Appl. No.: 169,385

[22] Filed: Dec. 20, 1993

[51] Int. Cl.⁶ ............................................. A47J 27/00
[52] U.S. Cl. ...................................... 99/348; 99/325; 99/468; 99/486; 366/146
[58] Field of Search .................. 99/348, 344, 468, 352, 99/353, 325, 483, 484, 486, 327, 328, 329 R, 467; 366/146, 205, 314, 69, 96, 97, 98

[56] References Cited

U.S. PATENT DOCUMENTS

| | | |
|---|---|---|
| 4,234,605 | 11/1980 | Takeuchi . |
| 4,294,166 | 10/1981 | Takeuchi . |
| 4,538,509 | 9/1985 | Ojima et al. . |
| 4,649,810 | 3/1987 | Wong . |
| 4,762,057 | 8/1988 | Hirota et al. . |
| 4,776,265 | 10/1988 | Ojima . |
| 4,779,522 | 10/1988 | Wong . |
| 4,820,054 | 4/1989 | Wong . |
| 4,836,683 | 6/1989 | Aoyama . |
| 4,844,048 | 7/1989 | Aruga et al. . |
| 4,885,176 | 12/1989 | Nakakura et al. . |
| 4,903,587 | 2/1990 | Nagasaka et al. . |
| 4,903,588 | 2/1990 | Horiuchi et al. . |
| 4,903,589 | 2/1990 | Aoyama . |
| 4,930,899 | 6/1990 | Aoyama . |
| 4,938,125 | 7/1990 | Wong . |
| 4,942,807 | 7/1990 | Wong . |
| 4,951,559 | 8/1990 | Arao et al. . |
| 4,957,040 | 9/1990 | Nakakura et al. . |
| 4,977,822 | 12/1990 | Seo et al. . |
| 4,984,512 | 1/1991 | Takahashi et al. . |
| 5,076,153 | 12/1991 | Takahashi et al. . |

Primary Examiner—Robert W. Jenkins
Attorney, Agent, or Firm—Kerkam, Stowell, Kondracki & Clarke

[57] ABSTRACT

An automatic breadmaking appliance has an outer housing containing a baking chamber for receiving a mold in which the bread ingredients are mixed, kneaded and baked. A heating element located in the baking chamber supplies heat as necessary throughout the breadmaking process and an improved ventilating system is selectively operable under control of the appliance process controller to circulate cooling air through the baking chamber and to recirculate heated air from the upper region of the baking chamber to the lower regions thereof to accelerate heating and conserve energy. The ventilating system also effectively cools the housing and prevents condensation from forming thereon. Temperature sensing means located outside the baking chamber senses the temperature of the contents of the mold in the baking chamber. An improved viewing window, window cover, and light facilitate visual inspection of the bread being baked.

30 Claims, 6 Drawing Sheets

Tk - TIME OF KNEADING
Tr - TIME OF RISE
Tb - TIME OF BAKING

AUTOMATIC BREADMAKING MACHINE

BACKGROUND OF THE INVENTION

1. Field of the Invention

This invention relates to automatic breadmaking machines and, more particularly, to breadmaking machines especially adapted for home use for automatically carrying out a sequence of steps in a breadmaking process including mixing of the ingredients to form a dough, leavening and kneading the dough and baking the leavened dough to form the bread, all in the same mixing and baking mold.

2. Description of the Prior Art

Baking bread in the home has in the past been largely a manual operation although various devices such as mixers, kneaders, and the like have been available for use in performing specific steps in the process. More recently, automatic breadmaking devices have been developed and are commercially available, making it possible to produce a high quality bread which is baked at a preselected time, with the only manual steps required being measuring the raw ingredients and depositing them in the machine and programming the controls for automatically completing the process and baking the bread at the desired time.

The various steps in the process of breadmaking are sensitive both to time and temperature and many factors can influence the process so that bread produced in the known automatic breadmaking devices has not always been consistent in color, texture, or other characteristics. Further, in the known automatic breadmaking devices, it has not generally been possible to visually monitor the process once it has commenced since opening or removal of the closed top could disrupt the time-temperature relationship under control of the process controller. Viewing windows have been provided, but they generally have been relatively small and were not effective in retaining heat in the baking chamber.

In the prior art automatic breadmaking devices commercially available, temperature of the materials in the mold generally is monitored by a temperature sensor maintained in pressure contact with the external surface of the mold within the enclosed baking chamber where the temperature sensor may be influenced by radiant heat from the heating element also contained within the chamber.

The known automatic breadmaking devices also generally provide for ventilation of the baking chamber, including forced ventilation during certain steps of the process, but the known ventilation systems have not always worked entirely satisfactorily either for evacuation of released fermentation gases from the chamber or for circulation of cooling air throughout the chamber to uniformly cool dough in the mold as upon excessive heat buildup during kneading or to recirculate heated air for more rapid warming or to produce an enhanced convection heating effect. Further, the known ventilation systems generally have not been effective either in cooling the external housing or in removing vapors and gas from areas of the housing outside the baking chamber.

SUMMARY OF THE INVENTION

It is the primary object of the present invention to provide an improved home breadmaking apparatus which overcomes the shortcomings of the known automatic breadmaking machines as outlined above.

Another object of the invention is to provide an automatic breadmaking machine having improved temperature sensing and control means for controlling the temperature of the dough being processed and baked.

Another object is to provide such a breadmaking apparatus including means for permitting improved visual inspection of the contents of the mold without permitting excessive heat loss.

Another object of the invention is to provide such an improved breadmaking apparatus having improved ventilating means.

Another object is to provide such a breadmaking apparatus including ventilating means operable to selectively recirculate air from the upper portion of the baking chamber to the lower portion to provide more rapid heating of the chamber and to provide an enhanced convection heating effect in the chamber.

In the attainment of the foregoing and other objects of the invention, an important feature resides in providing an automatic breadmaking apparatus of the type including a housing for enclosing a baking chamber containing a removable mixing, kneading and baking mold, and a power driven kneading means for kneading the ingredients into dough in the mold. A heater for warming the dough and for cooking the bread is mounted in the baking chamber outside the mold and a programmable process controller controls a sequence of steps in accordance with a stored program and in response to sensed temperature during the program. An improved ventilating system is provided to more effectively control the temperature and ventilation of the cooling chamber and to effectively cool the external housing of the breadmaking apparatus.

In operation of the improved breadmaking apparatus, the temperature of the product in the mold is sensed by a temperature sensor located outside the baking chamber in an area where the temperature sensor is unaffected by radiation from the heating element. An integral part of the mixing and baking mold projects through an opening in the bottom of the baking chamber in position to contact the temperature sensor, and the temperature sensor is calibrated to relate the temperature sensed to the temperature of the bread in the mold. A power ventilating system is adapted to ventilate both the baking chamber and the enclosed housing outside the baking chamber to cool the housing and provide a more stable, controlled temperature in the chamber and of the dough being processed in the mold. The ventilating system includes selectively operating means for recirculating air from the higher temperature upper region of the baking chamber into the lower region of the chamber to accelerate warming of the chamber as necessary, for example, during the initial mixing and kneading, and to provide a convection heating effect during the baking cycle. The ventilating system also withdraws air from the area of the housing outside the baking chamber to provide enhanced housing cooling.

BRIEF DESCRIPTION OF THE DRAWINGS

The foregoing features and objects of the present invention will be apparent from the detailed description contained hereinbelow, taken in conjunction with the drawings, in which.

DESCRIPTION OF THE PREFERRED EMBODIMENTS

Figure 1:
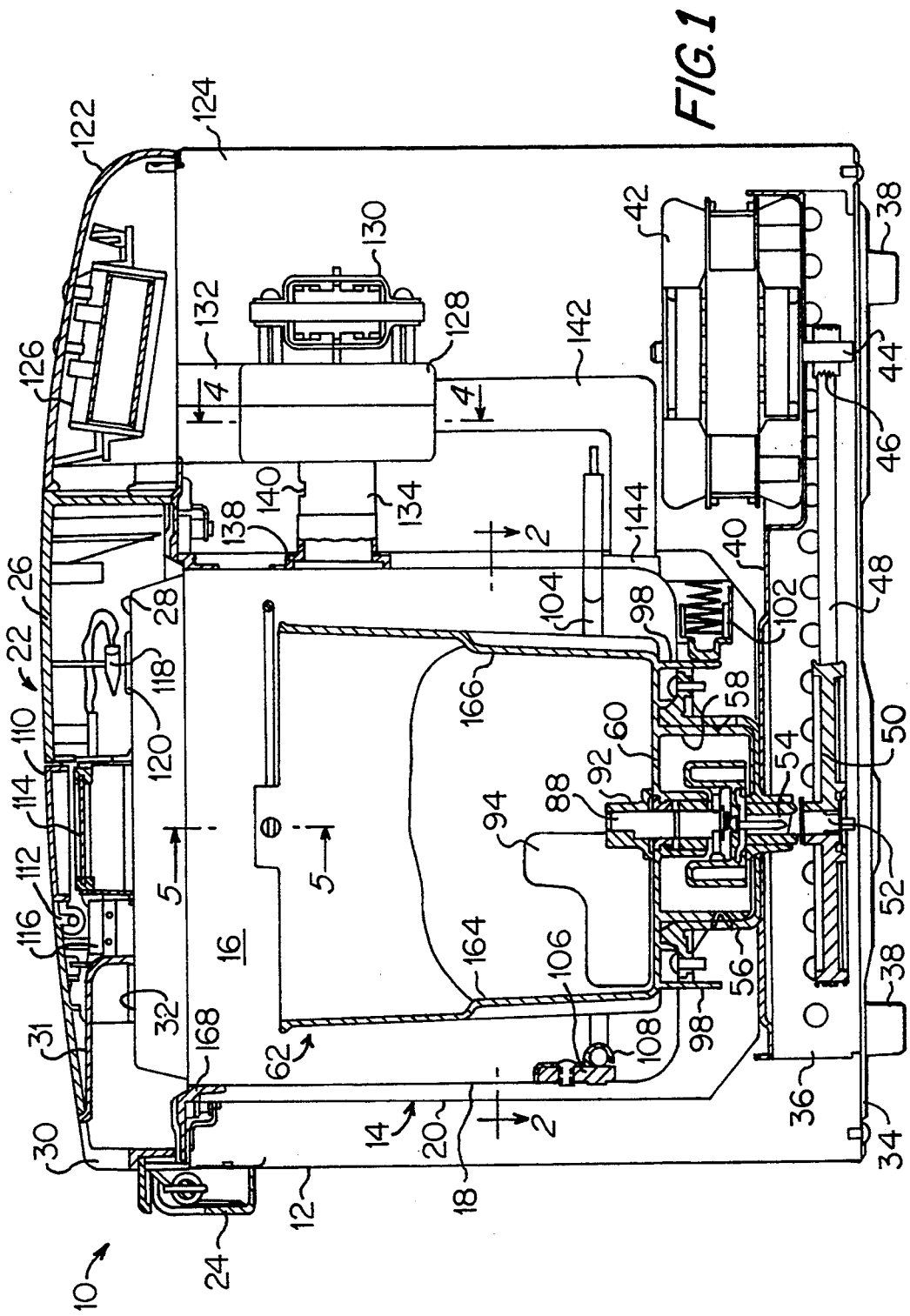
FIG. 1 is a sectional view, in elevation, of an improved breadmaking apparatus according to the present invention.

Referring now to the drawings in detail, a breadmaking apparatus according to the present invention is indicated generally by the reference numeral 10 and includes an external housing 12 within which is disposed an open-topped, double-walled casing 14 defining an oven or baking chamber 16. The inner and outer walls 18, 20, respectively, of casing 14 are spaced apart to minimize the transfer of heat into and out of the chamber 16, and insulating materials, not shown, may be provided between walls 18, 20.

A top cover assembly 22 is mounted adjacent the top of housing 12 by a spring biased hinge member 24 with cover 22 including an outer panel 26 and an inner panel 28 spaced inwardly from the outer panel and normally closing the baking chamber 16 during use of the apparatus to make bread. An opening 30 in outer panel 26 and a baffle or channel member 31 cooperate with an opening 32 in inner panel 28 to provide a vent through the top cover enabling cooling air to flow into the chamber 16 and permitting the escape of fermentation gases from the chamber during various phases of the breadmaking process as explained more fully hereinbelow.

Housing 12 has a bottom panel 34 which supports, on its inner surface, a rigid metal frame 36, and a plurality of resilient feet 38 are attached as by screws, not shown, through panel 34 to the metal frame 36 to support the entire mechanism in spaced relation above a support surface.

Frame 36 includes a stepped top panel 40 spaced above the bottom panel 34. A kneading motor 42 is supported on the top surface of panel 40 in laterally spaced relation to the casing 14, and motor shaft 44 projects downwardly to support a small pulley 46 within the space between panels 34 and 40. A belt 48 extends around pulley 46 and around a larger pulley 50 supported on a drive shaft 52 which extends vertically upward through a bearing 54 in a transmission housing 56 rigidly mounted on the top surface of panel 40 centrally of the casing 14.

Figure 2:
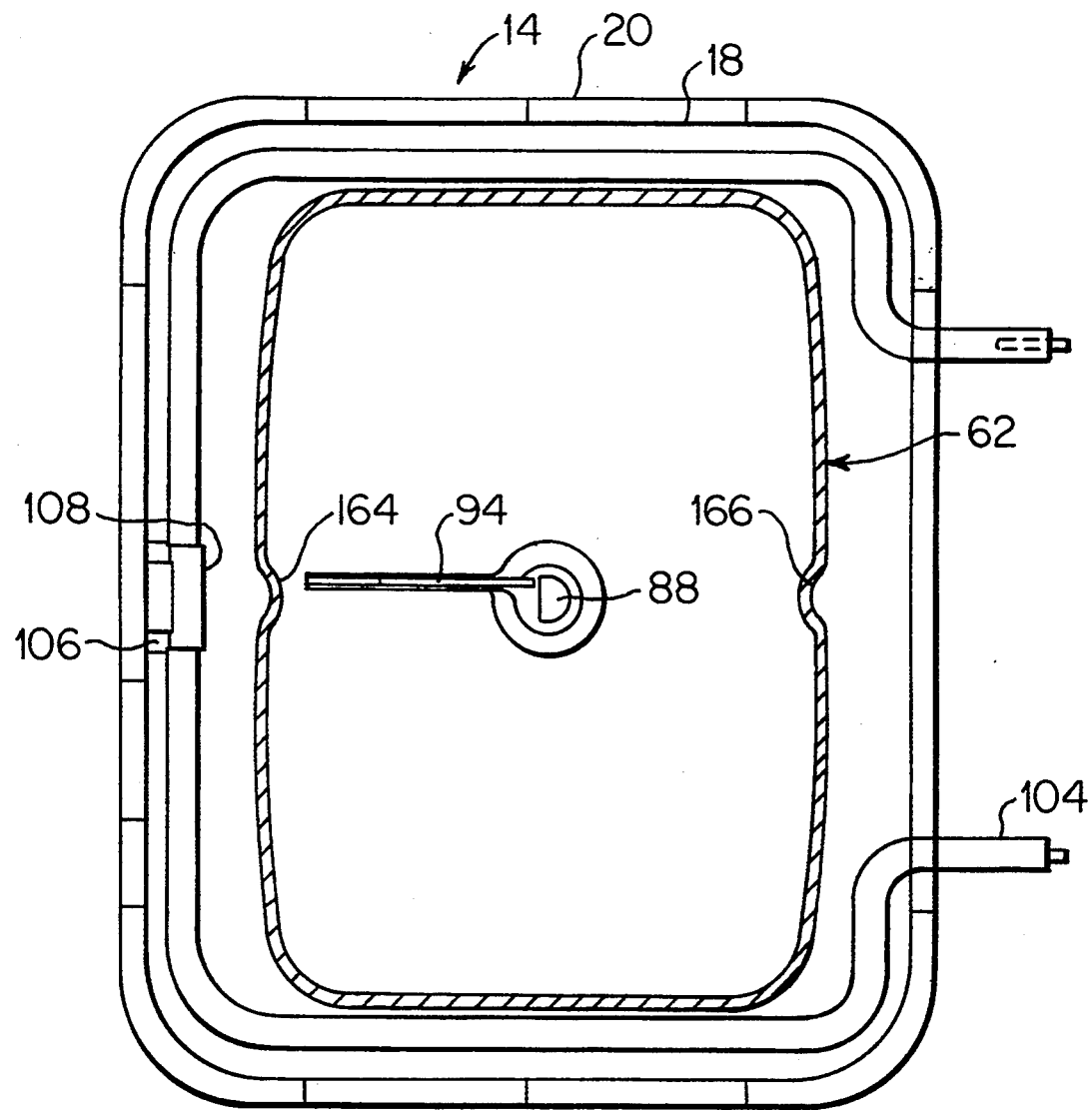
FIG. 2 is a sectional view taken along line 2—2 of FIG. 1.
Figure 3:
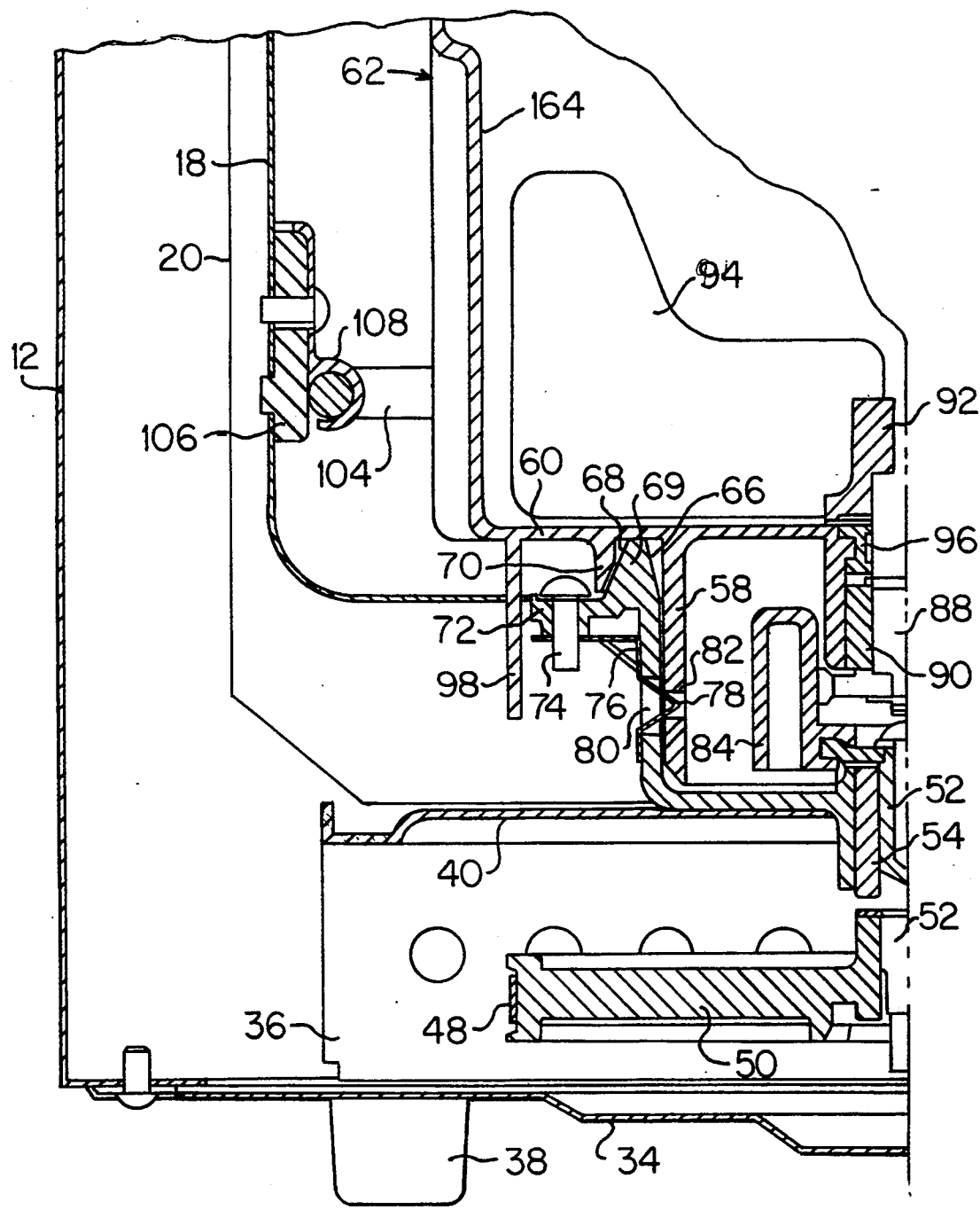
FIG. 3 is an enlarged view of a portion of the structure shown in FIG. 2.

Transmission housing 56 is disposed in an opening in the bottom of inner and outer walls 18, 20 of the casing. Transmission housing 56 is a generally cup-shaped rigid element having an open top dimensioned to receive a downwardly projecting cylindrical sleeve 58 on the bottom wall 60 of a bread kneading and baking mold 62. As best seen in FIG. 3, transmission housing 56 terminates at its top periphery in an enlarged rim portion 64 having a downwardly and inwardly tapered cam surface 66 extending around its inner surface for engaging a correspondingly tapered peripheral portion on the bottom outer edge of sleeve 58 to facilitate positioning the mold 62 for use in baking bread. A similar downwardly and outwardly tapered surface 68 is formed on the outer edge portion of rim 64 in position to engage and cooperate with a complementary tapered surface on a short stabilizing hub 70 on the bottom wall 62 when the mold is positioned within the baking chamber to accurately locate and stabilize the mold in the transmission housing. An outwardly extending flange 72 is formed on the bottom of rim 64 and suitable means such as rivets or screws, indicated at 74, secure the inner wall 18 to the transmission housing so that housing 56 closes and forms a part of the bottom wall of casing 14. The rivets 74 may also be employed to attach resilient spring clips 76 to the bottom surface of flange 72, with the spring clips 76 each including a deformed or bent portion 70 extending through an opening 80 in sleeve 58 and projecting into and cooperating with a recess 82 in sleeve 58 to form a detent resiliently but releasably retaining the mold 62 against withdrawal once the mold is mounted in the position shown in FIG. 3. Preferably, at least one pair of the spring clip detent retainers are provided, one on diametrically opposite sides of the vertical axis of the drive shaft 52. As seen in FIG. 2, mold 62 is generally rectangular in cross section so that it can only be inserted into the baking chamber in the position illustrated or rotated 180° from this position. The spring clips 76 effectively join the mold to the casing wall and stabilize the mold against vibration or movement during kneading.

Referring again to FIGS. 1 and 3, it is seen that shaft 52 has a drive element 84 mounted on its upper end within transmission 56 in position to engage and drive a driven member 86 supported on the bottom end of a shaft 88. Shaft 88 is rotatably mounted by a bearing 90 supported in a downwardly directed hub 92 located centrally within the bottom panel 60 of mold 62. A mixing and kneading paddle, or blade 94 is removably mounted on the upwardly projecting end of shaft 88 within the mold 62. A seal element 96 in the hub 92 engages and forms a seal with the shaft 88 so that fluid and other bread ingredients in the mold are retained against leakage.

A pair of downwardly projecting finger members 98 are formed on the bottom panel 60 in position to project through corresponding openings in the bottom panel portion of inner wall 18 when mold 62 is installed in the position shown in FIG. 1. A temperature sensor, indicated generally at 100, is mounted on the outer surface of the bottom portion of inner wall 18 by a bracket 102 in position to resiliently engage one of the fingers 98 when the mold is installed. Mold 62 is formed from a metal material such as cast aluminum which is a good conductor of heat so that the temperature of the mold wall in contact with the moist dough in the mold is substantially equal to the temperature of the dough. This heat is conducted downwardly through the opening in the bottom portion of inner wall 18 by the fingers 98 and is sensed by the temperature sensor 100. The temperature sensor is calibrated to compensate for the minor heat differential of the mold and finger 98 at the location of the sensor, so that the temperature sensed accurately reflects the temperature of the dough in the mold. At the same time, the temperature sensor is located outside of the inner wall 18, i.e., between the bottom portion of inner and outer walls 18 and 20, so as to be shielded from any convection or radiation heat from the metal sheathed heating element 104 extending around the baking chamber 16 adjacent the surface of the inner wall 18 near the bottom of the baking chamber. This metal sheathed heating element 104 is supported on inner wall 18 by thermal insulating blocks 106 and clip members 108.

The top panel 26 has a viewing window or opening formed therein which is normally closed by a cap 110 hinged, as at 112, to permit the cap to be opened. A transparent heat resistant glass panel 114 extends over and closes the window while permitting direct viewing through the top cover into the interior of the baking chamber. A micro-switch 116 is supported adjacent the window opening in position to be actuated upon lifting of the cap 110 to energize a circuit to a lamp 118 supported above a heat resistant glass panel 120 in an opening in inner wall 28 of the top cover to illuminate the interior of the baking chamber and of the mold 62 when the lid 110 is raised. Thus, the breadmaking process in the mold may be visually monitored from the exterior of the apparatus without opening the cover 22. The movable cap 110 cooperates with the transparent panel 114 to maintain the double-walled thermal integrity of the cover 22 when the cap is closed, thereby making it practical to employ a panel 114 which is large enough to permit clear viewing of the interior of the mold.

A rigid cover panel 122 is mounted on the top of housing 12 and forms, in effect, a continuation of the hinged cover 22. Panel 122 extends over and encloses an equipment chamber 124 in housing 12, and a process controller indicated generally at 126 is supported on cover panel 122 within the top portion of chamber 124. A ventilation blower 127 mounted within blower housing 128 and driven by a motor 130 is supported within chamber 124 above the kneading motor 42. A first ventilation duct 132 is connected to housing 128 and extends outwardly through an opening, not shown, in cover panel 122 providing an outlet from the blower to the atmosphere. The blower inlet is connected to a second duct 134 which, in turn, is connected to the baking chamber 16 via an adapter 138 mounted on and extending through the outer and inner walls 20, 18, respectively, at a location below the open top of mold 62. A vent, indicated generally at 140, is formed in the top portion of duct 134 for purposes more fully explained hereinbelow.

Figure 4:
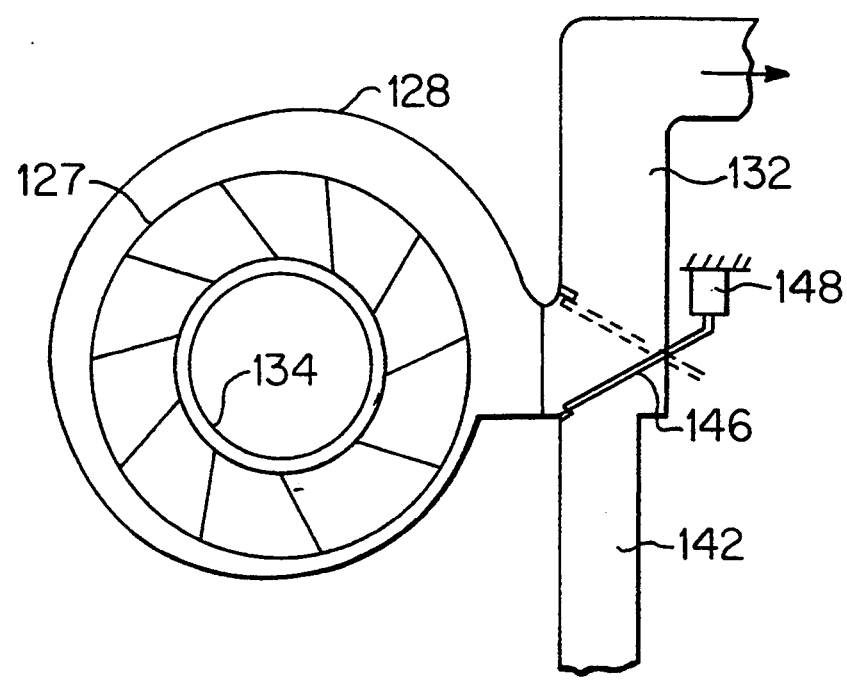
FIG. 4 is a fragmentary sectional view taken along line 4—4 of FIG. 1.

As seen in FIGS. 1 and 4, outlet duct 132 is joined to a recirculation duct 142 which, in turn, is connected to the baking chamber 16 through an adapter 144 extending through walls 20, 18. A valve member 146 is mounted at the juncture of ducts 132 and 142, for movement by suitable solenoid actuator 148 between the solid line and broken line positions shown in FIG. 4. Valve 146 may be selectively actuated to direct the ventilation blower discharge to the atmosphere through duct 132 for cooling or back to the baking chamber 16 through duct 142. By recirculating air withdrawn from the upper regions of chamber 16 back into the lower regions of the chamber, accelerated heating is achieved and electric energy is conserved. Preferably, adapter 144 is located below the level of heating element 104 so that recirculated air flows over the heating element to produce more effective convection heating and to minimize localized radiation heating of the sidewall of mold 62 adjacent the heating element 104. Further, during the initial mixing and kneading portion of the breadmaking cycle, when the temperature of the ingredients and/or atmosphere is below that desired, recirculation of air through the baking chamber quickly raises the temperature to the desired level.

The duct 134 is connected into the chamber 16 on the side thereof substantially opposite to the vent opening 30 in cover 22 so that when motor 130 is energized to drive the blower within housing 128 and valve 146 is in the solid line position shown in FIG. 4, cooling air is drawn through the vent 30 and opening 32 into the baking chamber at the top and to one side of the chamber, then across the open top of the mold to provide a cooling effect for dough in the mold. At the same time, the location of the inlet adapter 138 below the top of the mold tends to withdraw air from the entire chamber, causing a portion of the cooling air entering the chamber to circulate around the external surface of the mold to increase the cooling effect and provide a more uniform cooling of dough in the mold.

Operation of the vent blower also causes air to be withdrawn from the interior of the housing externally of the baking chamber through vent 140 regardless of the position of valve 146. This provides a cooling effect for the housing 12, and for the equipment including motors 42 and 130 and, more importantly, for the process controller 126 located within the housing outside the baking chamber. Since the vent opening 140 is in the top half of duct 134, any condensate which may form and collect in duct 134 during fermentation or when the blower is not being operated is prevented from dripping downwardly into the equipment chamber of the housing or onto kneading motor 42. Any condensation which does form in the vent duct 134 will either drain back into the baking chamber or into the blower housing 128 where it will again be vaporized by heat from heating element 104 or from heat generated within the dough during kneading.

Figure 5:
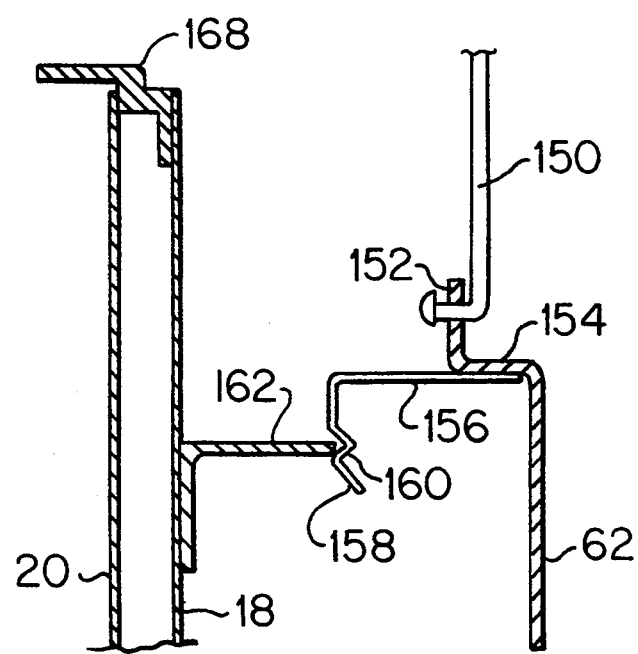
FIG. 5 is an enlarged fragmentary sectional view taken on line 5—5 of FIG. 1 showing an alternate means for releasably securing the mold in the apparatus.

FIG. 5 illustrates an alternate system for releasably retaining the mold 62 in the baking chamber and for preventing the mold from vibrating during mixing and kneading. This arrangement may be employed in cooperation with or instead of the spring clip 76 and related detent structure described hereinabove. The mold 62 is provided with a lifting bail 150 having its opposed ends supported in openings in a pair of ears 152 projecting upwardly from the outer edge of an out-turned ledge 154 formed one on each of the shorter or end walls of the generally rectangular mold. A spring clip 156 is rigidly attached to the bottom surface of each ledge 154 and projects outwardly therefrom. Each clip 156 terminates in a downwardly directed free end portion 158 having an inwardly directed notch or detent 160 formed therein. A pair of bracket members 162 are rigidly attached to the inner surface of wall 18 in position to engage and deflect the free end portion 158 of the clips 156 inwardly until the bracket snaps into the detent 160 when the mold is inserted into the chamber 16. The resistant force of the spring clips 156 on opposed sides of the mold 62 stabilizes the mold and firmly retains it in place during the mixing and kneading phases of the breadmaking cycle. As indicated above, the spring edges 156 and brackets 162 may be employed in combination with the spring clips 76 when additional stability is desired, or may be used in place of the clips 76.

In operation of the breadmaking apparatus to bake bread, the top cover 22 is opened and the breadmaking mold 62 is positioned in the casing 14 with the sleeve 58 telescoped into the transmission housing and pressed firmly downward until the bottom wall 60 of the mold is seated firmly on the top rim 64 of the transmission housing. In this position, one or both the spring clip retaining mechanisms snap into position to firmly retain the mold against vibration and inadvertent lifting during mixing and kneading. Removable kneading blade 94 is then positioned on shaft 88 and the measured bread ingredients are deposited in the mold.

If the breadmaking process is to be commenced immediately, or delayed for only a relatively short period of time, the ingredients may be deposited in the mold in any random manner. However, if the process is to be delayed for a substantial period, as overnight, the ingredients are deposited in a manner to maintain the yeast and liquid separate so as to substantially prevent the yeast from becoming moist and activated prior to commencing of the initial mixing operation. This separation may be maintained by initially depositing the yeast in a mound on the bottom of the mold, then covering the yeast with flour and other dry ingredients and finally depositing the water and/or other liquids into the mold in a manner so as not to cause the liquid to disturb or substantially penetrate the dry ingredients covering the yeast. Alternatively, all the dry ingredients except the yeast may be deposited on the mold in a mound and the liquid deposited in the mold and permitted to flow around the base of the mound. Thereafter, the yeast may be deposited on top of the other dry ingredients so as not to come into contact with the liquid.

The cover 22 may then be closed and the breadmaking process commenced promptly or delayed in accordance with the programming of the process controller in the manner described hereinbelow. As the initial step in the process, the ingredients are mixed in mold 62 by energizing the motor 42 to drive pulley 46 and belt 48 which, in turn, drives pulley 50 to thereby rotate the shaft 52 and mixing and kneading blade 94 around the vertical axis of shaft 88. The generally rectangular shape of the mold 62, in combination with the action of two inwardly projecting corrugations or ribs 164, 166 formed in the walls of the mold 62 cooperate to effectively mix the wet and dry ingredients into a dough and to knead the dough. Ribs 164, 166 are formed one in each of the longer sidewalls of the mold at approximately their center and extend from the bottom panel 60 upwardly only approximately ½ the height of the mold. The height of the ribs 164, 166 is sufficient to cooperate with the blade 94 for kneading and degassing the dough, but their relatively short height produces a more uniform, pleasing appearance for the loaf of bread baked in the mold since corresponding indentations are not formed in the bread on the upper half of the loaf.

The initial mixing and kneading operation is continued for a predetermined time, which kneading operation tends to generate heat within the mass of dough. Heat is effectively retained in the baking chamber 16 by the double wall construction of the casing 14 and by the inner panel 28 of spring-biased cover 22 which effectively seats on and forms a seal with the open top rim 168 of the casing when the cover is in the closed position. Since the moist dough is in direct contact with the inner surface of mold 62, the mold is at essentially the same temperature as the dough, and this temperature is continuously monitored by the temperature sensor 100 in contact with one of the integral fingers 98.

If the temperature is indicated to be below a predetermined desired minimum during the initial mixing and kneading steps, controller 126 energizes heating element 104 to increase the temperature in the baking chamber 16. At the same time, ventilation motor 130 is energized and solenoid 148 is actuated to recirculate air through the baking chamber over the heating element 104 to rapidly raise the temperature of the dough being mixed and kneaded. Conversely, if temperature sensor 100 indicates that the temperature is above a predetermined or desired maximum, ventilation fan motor 130 is energized and valve 146 is moved to the position to exhaust the ventilation air to atmosphere to thereby draw cooling air through the vent openings 30 in outer panel 26 and opening 32 in inner panel 28 of the cover 22. In this regard, it is noted that the vent through openings 30 and 32 permits limited continuous ventilation of the chamber 16 to enable fermentation gases to escape when the forced ventilation system is not energized. Contact between the flange 168 and a mating surface on the inner panel 28 of the spring-biased cover 22 maintains an effective seal so that all gas or air flow into the baking chamber is through the ventilating openings 30, 32.

After completion of the initial kneading period, the dough is permitted to rest, or ferment, for a predetermined time during which the temperature is continuously monitored and maintained between the above-mentioned predetermined maximum and minimum temperatures by selective energization of heater 104 and/or fan motor 130, and valve 146 as required.

Upon completion of the fermentation period, the dough is again subjected to a kneading step for a predetermined time during which the temperature is still maintained within the predetermined limits in the manner described. Kneading tends to generate substantial heat within the dough mass, and operation of the ventilating fan will more likely be required whereas the heater may be energized more during the rest period.

Following the second kneading step, the dough is permitted to rise for a predetermined time during which the temperature is continuously monitored and the heater and ventilation system are operated as necessary to maintain the temperature of the dough between second upper and lower desired levels.

After the dough has been permitted to rise for the desired time, it is subjected to a degassing operation for a brief period, for example one half minute, by rotation of the kneading blade 94, following which the dough is baked for a predetermined time. During the baking operation, the heating element 104 and recirculation system are operated continuously until the dough reaches a first predetermined baking temperature as sensed by sensor 100. Thereafter, heater 104 and recirculation system are operated periodically until the sensed temperature reaches a second predetermined maximum baking temperature and thereafter operated intermittently to maintain the sensed temperature between the maximum baking temperature and a third baking temperature which is less than the predetermined maximum baking temperature. The temperature to which the dough is heated during the first baking step wherein heater 104 is continuously energized may be selectively varied as explained hereinbelow to control the color of the finished or baked bread.

Throughout the breadmaking process, substantial water vapor may be generated within the baking chamber. While most of this water vapor escapes the chamber through vent openings 32 and 30 in the cover 22, or is withdrawn from the chamber by operation of the ventilation fan and motor, some may escape from the baking chamber into the surrounding housing. Operation of the ventilation fan draws air through opening 140 in duct 134 during forced ventilation or recirculation portions of the breadmaking cycle to remove this water vapor from the housing and to effectively cool the external housing 12. Also, location of the inlet of ventilation duct 134 at a level below the open top of mold 62 more effectively evacuates fermentation gases and cools the baking chamber since cooling air flowing through the openings 30 and 32 into the chamber does not have a direct, or "short circuit" path from opening 32 to the inlet of the duct 134. This results in cooling air flowing into the interior of the mold 62 to cool the top surface of the dough as well as around the external surface of the mold before reaching the inlet to the evacuation blower.

Figure 7:
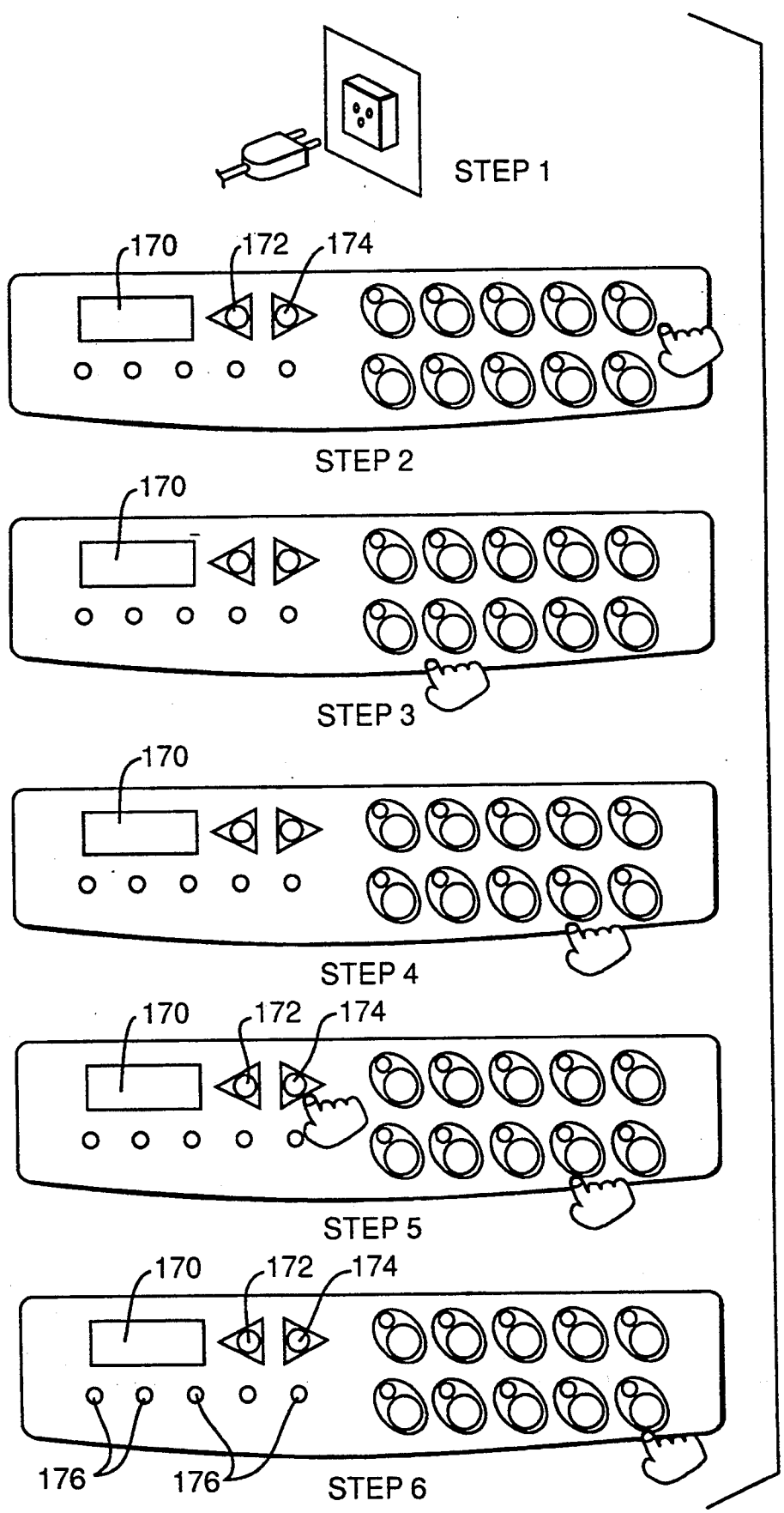
FIG. 7 is a composite view showing steps in programming the process controller of the apparatus.

The process controller 126 is programmed to selectively follow one of a number of different processes each adapted to a particular type of bread to be baked. As shown in FIG. 7, after the apparatus is connected to a suitable electrical outlet (step 1), the type of bread to be baked may be manually selected by pressing the appropriate process selection button as indicated in step 2. Next, the operator selects the color of the crust as dark, brown or light in the manner indicated in step 3, after which the start button is depressed as indicated in step 4 if the breadmaking process is to be commenced immediately.

If the breadmaking is to be delayed, for example, to have the bread baked and ready to eat in the morning in time for breakfast, the desired start time is set on the digital display window 170 by pressing the appropriate time set button 172, 174 and thereafter, the start button is pressed as shown in step 5. The breadmaking process will then commence in time to complete the baking step at the desired preset time.

If an error is made in setting the start time, or if for any reason the process is to be interrupted and reset after steps 2 through 5 have been completed, the stop button can be pressed to stop the process. Indicator lights 176 on the display panel continuously indicate the phase of the process which the apparatus is in after the process has been started. The process can also be monitored by lifting the lid 110 and viewing the condition of the dough or bread being baked through the window 114. Lifting the lid 110 actuates the microswitch 116, which in turn energizes the lamp 118 to facilitate the viewing or inspecting process. Thus, the process can be visually monitored without opening the cover 22 and permitting the undesired escape of heat from the baking chamber and adversely influence the breadmaking process.

Figure 6:
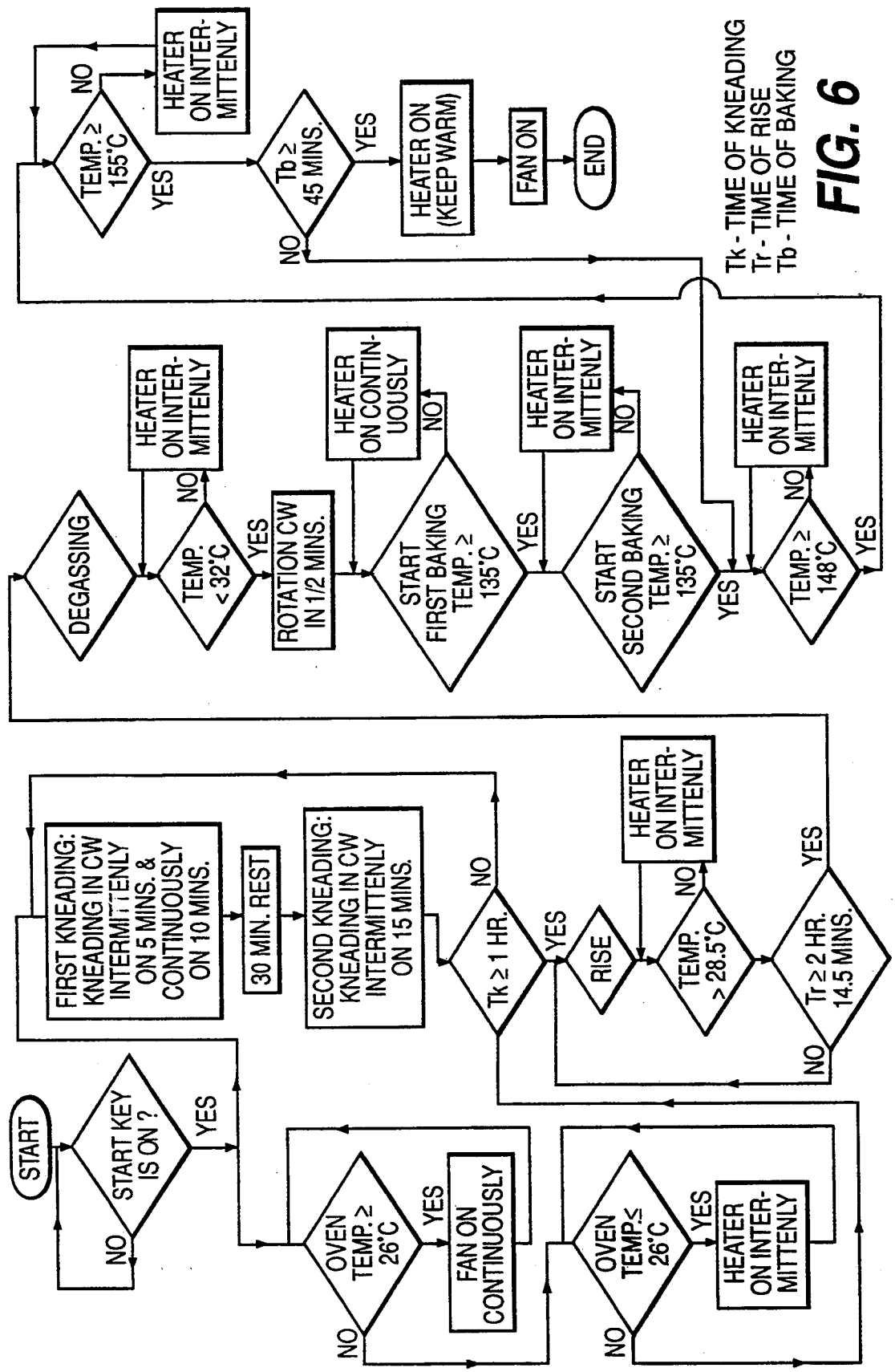
FIG. 6 is a schematic flow diagram of the process controller program showing times and temperature ranges for one setting of the controller.

A process controller program for baking basic white bread is schematically illustrated in the flow chart of FIG. 6. Referring to this flow diagram, it is seen that, once the process is started the initial kneading operation commences and the temperature sensor senses the temperature and operates the fan motor 130 and/or the heater element 104 as necessary to maintain the temperature of the material in the baking mold between 22° C. and 26° C. Initially, the kneading motor 42 is operated intermittently for five minutes, then continuously for ten minutes for an initial mixing-kneading period of fifteen minutes. The dough is then permitted to rest for thirty minutes before commencing a second kneading operation wherein the kneading motor 42 is operated intermittently for fifteen minutes. At the end of the second kneading period, the dough it permitted to rise for approximately 2 hours and 15 minutes during which the temperature is maintained between 28.5° C. and 10° C. by intermittently operating the heater 104 and/or ventilation-recirculation system. At the end of the rising step, the kneading motor 42 is again energized for 30 seconds to degas the fermented dough and during this degassing step, the heater and recirculation system are operated as necessary to maintain the dough temperature within the range of 32° to 32.5° C.

At the end of the degassing step, the baking cycle is commenced and the heater and recirculation system are operated continuously until the temperature of the dough is sensed to be at least 135° C., assuming "brown" color is selected. Thereafter, the heater and recirculation system are energized intermittently to increase the sensed temperature to a maximum of 155° C. and then to maintain the temperature within the range of 148° C. to 155° C. for a total baking time of forty-five minutes. At the completion of the forty-five minute baking cycle, the bread is fully baked and the heater is energized only intermittently to maintain the bread warm. During the warming cycle, the ventilation fan may also be operated.

It is noted that the initial target temperature at the beginning of the baking cycle is varied by the setting of the color selection switch. For example, for a lighter color bread, the initial temperature may be set at 130° C., whereas, for a dark crust, this initial temperature may be 142° C. The color and condition of the bread may be monitored, through the viewing window, and with the assistance of the lamp, to assist the consumer in planning the meal so that the freshly baked bread may be consumed promptly upon completion of the baking cycle, if desired.

While preferred embodiments of the invention have been disclosed and described in detail, it should be understood that the invention is not so limited, but rather it is intended to include all embodiments which would be apparent to one skilled in the art and which come within the spirit and scope of the invention.

What is claimed:

1. In an automatic breadmaking appliance including a housing having a bottom wall, upwardly extending sidewalls and an open top, an oven chamber having a bottom, sidewalls and an open top located in the housing in spaced relation to said housing bottom wall and sidewalls, a hinged cover mounted on the housing and movable between a closed position closing the housing and the oven chamber and an open position, an open-topped bread mold removably mounted in the oven chamber with the open top of the bread mold spaced below the top of the oven chamber, a mixing and kneading paddle removably mounted in the mold, a drive motor connected with the paddle for mixing and kneading dough in the mold, a heater located in the lower region of the oven chamber externally of the mold, and a process controller for controlling operation of the drive motor and the heater, an improved ventilating system comprising a motor driven blower mounted in said housing outside of said oven chamber, said blower having an inlet connected to the oven chamber through the sidewall thereof and an outlet, first and second duct means each having one end connected to said outlet, said first duct means having its other end open to the atmosphere and said second duct means having its other end connected to said oven chamber adjacent the bottom thereof, and valve means movable between a ventilating position closing said second duct means and opening said first duct means for directing the blower outlet to the atmosphere and a second position closing said first duct means and opening said second duct means for recirculating air from the blower outlet to the bottom portion of the oven chamber said process controller including means for controlling operation of the ventilation blower and said valve means in coordination with said drive motor and said heater.

2. The breadmaking appliance defined in claim 1 wherein said inlet is connected to the oven chamber through an opening in the sidewall thereof at a location adjacent to but below the open top of said mold.

3. The breadmaking appliance defined in claim 2 further comprising a ventilation opening in said hinged cover to provide a flow path for air into the oven chamber and an escape path for gas from the chamber.

4. The breadmaking appliance defined in claim 3 wherein said ventilating opening in said hinged cover is located adjacent the sidewall of the oven chamber substantially opposite the location at which the blower inlet is connected to the oven chamber whereby air drawn through said ventilation opening by the blower will flow substantially across the full width of the oven chamber and around the mold therein.

5. The breadmaking appliance defined in claim 1 further comprising means for continuously sensing the temperature of dough in the mold.

6. The breadmaking appliance defined in claim 5 wherein said process controller includes timing means, and wherein said process controller is responsive to both the means for continuously sensing the temperature of dough in the mold and the timing means to control the position of said valve means.

7. The breadmaking appliance defined in claim 1 further comprising a housing vent opening means connected to said blower inlet whereby operation of the blower to withdraw air from the oven chamber will also withdraw air and vapors from the housing outside the oven chamber to thereby cool the housing and prevent water vapor condensation in the housing.

8. The breadmaking appliance defined in claim 7 further comprising third duct means connecting said blower inlet to said oven chamber, and wherein said housing vent opening means comprises an opening in said third duct means at a location between said oven chamber sidewall and said blower inlet.

9. The breadmaking appliance defined in claim 8 wherein said opening in said third duct means is formed in an upwardly directed wall of said third duct means whereby, when said blower is not being operated to withdraw air and vapors from the oven chamber and housing, any condensate formed in the third duct means is prevented from dripping therethrough into the housing.

10. The breadmaking appliance defined in claim 9 further comprising a ventilating opening in said hinged cover is located adjacent the sidewall of the oven chamber substantially opposite the location at which the blower inlet is connected to the oven chamber whereby air drawn through said ventilation opening by the blower will flow substantially across the full width of the oven chamber and around the mold therein.

11. The breadmaking appliance defined in claim 10 further comprising means for continuously sensing the temperature of dough in the mold.

12. The breadmaking appliance defined in claim 1 further comprising means for continuously sensing the temperature of dough in the mold including an opening formed in the bottom of said oven chamber, an elongated finger integrally formed on said mold and projecting downwardly therefrom in position to project through said opening in said oven chamber when the mold is mounted in the oven chamber, and a temperature sensor mounted outside said oven chamber and contacting said elongated finger for sensing the temperature thereof, said temperature sensor being calibrated to relate the sensed temperature of said finger to the temperature of dough in the mold.

13. The breadmaking appliance defined in claim 12 wherein said closed bottom of said oven chamber is defined by an inner wall and an outer wall spaced below said inner wall, said opening in the bottom of said oven extending through said inner wall only, and wherein said temperature sensor is mounted between said inner and said outer walls.

14. The breadmaking appliance defined in claim 13 wherein said process controller includes timing means, and wherein said process controller is responsive to both the means for continuously sensing the temperature of dough in the mold and the timing means to control the position of said valve means.

15. The breadmaking appliance defined in claim 14 further comprising third duct means connecting said blower inlet to said oven chamber, said third duct means having a housing vent opening therein between said oven chamber sidewalls and said blower inlet whereby operation of the blower to withdraw air from the oven chamber will also withdraw air and vapors from the housing outside the oven chamber to thereby cool the housing and prevent water vapor condensation in the housing.

16. The breadmaking appliance defined in claim 15 wherein said housing vent is formed in an upwardly directed wall of said third duct means whereby, when said blower is not being operated to withdraw air and vapors from the oven chamber and housing, any condensate formed in the third duct means is prevented from dripping therethrough into the housing.

17. The breadmaking appliance defined in claim 16 further comprising a ventilating opening in said hinged cover at a location adjacent the sidewall of the oven chamber substantially opposite the location at which the blower inlet is connected to the oven chamber whereby air drawn through said ventilation opening by the blower will flow substantially across the full width of the oven chamber and around the mold therein.

18. The breadmaking appliance defined in claim 1 wherein said hinged cover comprises inner and outer spaced panels, said inner panel engaging and closing the top of said oven chamber sidewalls, transparent window means formed in said inner panel, an opening in said outer panel overlying said transparent window, and a hinged lid mounted on said outer panel and normally closing said opening therein, said hinged lid being openable to permit viewing of the contents of the oven chamber through said transparent window.

19. The breadmaking appliance defined in claim 18 further comprising lamp means mounted on said cover for lighting the interior of the oven chamber, and switch means operable by said lid upon movement thereof to energize the lamp when the lid is opened.

20. The breadmaking appliance defined in claim 1 further comprising resilient stabilizing means releasably joining said bread mold and said oven chamber to resiliently resist movement of the bread mold in the oven chamber during bread kneading in the mold.

21. In an automatic breadmaking appliance including a housing having a bottom wall, upwardly extending sidewalls and an open top, an oven chamber having a bottom, sidewalls and an open top located in the housing in spaced relation to said housing bottom wall and sidewalls, a hinged cover mounted on the housing and movable between a closed position closing the housing and the oven chamber and an open position, an open-topped bread mold removably mounted in the oven chamber with the open top of the bread mold spaced below the top of the oven chamber, a mixing and kneading paddle removably mounted in the mold, a drive motor connected with the paddle for mixing and kneading dough in the mold, a heater located in the lower region of the oven chamber externally of the mold, and a process controller for controlling operation of the drive motor and the heater, the improvement comprising an opening formed in the bottom of said oven chamber, an elongated finger integrally formed on said mold and projecting downwardly therefrom in position to project through said opening in said oven chamber when the mold is mounted in the oven chamber, and a temperature sensor mounted outside said oven chamber and contacting said elongated finger for sensing the temperature thereof, said temperature sensor being calibrated to relate the sensed temperature of said finger to the temperature of dough in the mold.

22. The breadmaking appliance defined in claim 21 wherein said closed bottom of said oven chamber is defined by an inner wall and an outer wall spaced below said inner wall, said opening in the bottom of said oven extending through said inner wall only, and wherein said temperature sensor is mounted between said inner and said outer walls.

23. The breadmaking appliance defined in claim 22 wherein said process controller includes timing means, and wherein said process controller is responsive to both the temperature sensor and the timing means to control the position of said valve means.

24. In an automatic breadmaking appliance including a housing having a bottom wall, upwardly extending sidewalls and an open top, an oven chamber having a bottom, sidewalls and an open top located in the housing in spaced relation to said housing bottom wall and sidewalls, a hinged cover mounted on the housing and movable between a closed position closing the housing and the oven chamber and an open position, an open-topped bread mold removably mounted in the oven chamber with the open top of the bread mold spaced below the top of the oven chamber, a mixing and kneading paddle removably mounted in the mold, a drive motor connected with the paddle for mixing and kneading dough in the mold, a heater located in the lower region of the oven chamber externally of the mold, and a process controller for controlling operation of the drive motor and the heater, an improved ventilating system comprising
a motor driven blower mounted in said housing outside of said oven chamber, said blower having an inlet connected to the oven chamber through the sidewall thereof and at a location adjacent to but below the open top of the mold and an outlet,
a ventilation opening in said hinged cover to provide a flow path for air into the oven chamber and an escape path for gas from the chamber, and
said process controller including means for controlling operation of the ventilation blower in coordination with operation of said drive motor and said heater.

25. The breadmaking appliance defined in claim 24 wherein said ventilating opening in said hinged cover is located adjacent the sidewall of the oven chamber substantially opposite the location at which the blower inlet is connected to the oven chamber whereby air drawn through said ventilation opening by the blower will flow substantially across the full width of the oven chamber and around the mold therein.

26. The breadmaking appliance defined in claim 25 wherein said blower inlet is connected through a sidewall of said oven chamber at a location substantially opposite said one side thereof whereby operation of said blower to withdraw air from the chamber will draw air into the chamber through said vent openings and across substantially the full width of the oven chamber.

27. In an automatic breadmaking appliance including a housing having a bottom wall, upwardly extending sidewalls and an open top, an oven chamber having a bottom, sidewalls and an open top located in the housing in spaced relation to said housing bottom wall and sidewalls, a hinged cover mounted on the housing and movable between a closed position closing the housing and the oven chamber and an open position, an open-topped bread mold removably mounted in the oven chamber with the open top of the bread mold spaced below the top of the oven chamber, a mixing and kneading paddle removably mounted in the mold, a drive motor connected with the paddle for mixing and kneading dough in the mold, a heater located in the lower region of the oven chamber externally of the mold, and a process controller for controlling operation of the drive motor and the heater, the improvement wherein said hinged cover comprises,
an outer wall and an inner wall spaced from said outer wall, flange means on said inner wall adapted to engage and form a seal with said open top of said oven chamber when said hinged cover is in the closed position, and spring-biased hinge means resiliently urging said cover to the closed position wherein said flange means engages and forms a seal with the open top of said oven chamber, and vent openings in said outer and said inner walls of said hinged cover at a location near one side of said oven chamber to permit the flow of air into and the flow of gas from the oven chamber, said breadmaking appliance further comprising a motor driven blower mounted in said housing outside of said oven chamber, said blower having an inlet connected to the oven chamber through the sidewall thereof and an outlet, said blower being operable to draw air into said chamber through said vent opening in said hinged cover to be discharged from said outlet.

28. In an automatic breadmaking appliance including a housing having a bottom wall, upwardly extending sidewalls and an open top, an oven chamber having a bottom, sidewalls and an open top located in the housing in spaced relation to said housing bottom wall and sidewalls, a hinged cover mounted on the housing and movable between a closed position closing the housing and the oven chamber and an open position, an open-topped bread mold removably mounted in the oven chamber with the open top of the bread mold spaced below the top of the oven chamber, a mixing and kneading paddle removably mounted in the mold, a drive motor connected with the paddle for mixing and kneading dough in the mold, a heater located in the lower region of the oven chamber externally of the mold, and a process controller for controlling operation of the drive motor and the heater, the improvement comprising, mold stabilizing means engaging said bread mold to releasably retain the bread mold in said oven chamber, said mold stabilizing means including resilient means interposed between said oven chamber and said bread mold to resiliently resist movement of the bread mold within the oven chamber during kneading of dough in the bread mold.

29. The breadmaking appliance defined in claim 28 wherein said bread mold includes a bottom wall having downwardly depending flange means integrally formed thereon, detent means formed in said flange means, and resilient means normally engaging said detent means and releasably resisting movement of the bread mold in the oven chamber.

30. The breadmaking appliance defined in claim 28 wherein said mold stabilizing means comprises resilient spring means interposed between said bread mold and said oven chamber sidewalls at at least two substantially opposed locations, said resilient means resisting movement of the bread mold during the kneading operation.

* * * * *